United States Patent

Yamaoka et al.

(10) Patent No.: US 6,613,465 B2
(45) Date of Patent: *Sep. 2, 2003

(54) CONTROL DEVICE FOR A FUEL REFORMING APPARATUS

(75) Inventors: Masaaki Yamaoka, Toyota (JP); Masashi Yamashita, Nishikamo-gun (JP); Iwao Maeda, Nagoya (JP); Kiyomi Nagamiya, Toyota (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,778

(22) Filed: Nov. 30, 1999

(65) Prior Publication Data

US 2002/0071974 A1 Jun. 13, 2002

(30) Foreign Application Priority Data

Dec. 24, 1998 (JP) .......................................... 10-368081

(51) Int. Cl.[7] ................................................. H01M 8/00
(52) U.S. Cl. .............................. 429/13; 429/12; 429/20; 429/22
(58) Field of Search .............................. 429/12, 13, 20, 429/22

(56) References Cited

U.S. PATENT DOCUMENTS 5,401,589 A 3/1995 Palmer et al.
6,063,515 A * 5/2000 Epp et al. ...................... 429/17

FOREIGN PATENT DOCUMENTS

| EP | 0 798 798 A | 10/1997 |
| EP | 0 973 219 A2 | 1/2000 |
| EP | 0 973 220 A2 | 1/2000 |
| JP | A-7-296834 | 11/1995 |
| JP | 8-273685 | * 10/1996 ............ H01M/8/04 |

OTHER PUBLICATIONS

Chemistry, 2nd edition, by J. McMurry and R. C. Fay, Prentice–Hall, Inc. (1998).*

Chemistry by John McMurry and Robert Fay, Prentice–Hall, Inc., (1998).*

* cited by examiner

Primary Examiner—Carol Chaney
Assistant Examiner—Dah-Wei D. Yuan
(74) Attorney, Agent, or Firm—Oliff & Berridge, PLC

(57) ABSTRACT

A fuel reforming apparatus has a heating device, a reformer, and a CO oxidizing device. The heating device has a burning device for oxidizing fuel for burning with air and a vaporizing device for vaporizing the raw fuel. The control device for the fuel reforming apparatus has a raw fuel quantity determinator and a target temperature setting means for setting the target temperature of the raw fuel. The raw fuel quantity determinator determines a quantity of raw fuel supplied to the heating device. On the basis of the quantity of raw fuel supplied to the heating device by the determination of the raw fuel quantity determinator, the target temperature setting means sets a target temperature of the raw fuel. The heating device then heats the raw fuel to the predetermined target temperature by the control of the above-mentioned control device.

12 Claims, 5 Drawing Sheets

CONTROL DEVICE FOR A FUEL REFORMING APPARATUS

FIELD OF THE INVENTION

The present invention relates to a fuel reforming apparatus which generates mixed vapor by heating raw fuel such as methanol or etc. and reforms the mixed vapor to desired fuel such as a gas containing rich hydrogen by supplying the mixed vapor to a reformer in the fuel reforming apparatus. Especially, this relates a control device for the fuel reforming apparatus.

BACKGROUND OF THE INVENTION

As one example of the aforementioned fuel reforming apparatus, a fuel reforming apparatus, which generates reformed gas which mainly contains hydrogen gas reformed from methyl alcohol (or methanol) and water, is known. This fuel reforming apparatus has a copper alloy or so as a catalyst. If an activating temperature of the catalyst is, for example, approximately 280° C. (degree Celsius), when the temperature of the catalyst is below the above-mentioned value, the methanol is not sufficiently reformed and rather much methanol remains in the reformed fuel gas. Moreover, since a reforming reaction of methanol is an endothermic reaction, heat is supplied from an outer part of the catalyst in order to maintain the catalyst at the same temperature and to promote the fuel reforming reaction.

As a method of heating the catalyst, not only a heating by a burner is known, but a method of generating heat by oxidation and transferring the heat to the reformer is also known. The latter method can be called in another way a method by a partial oxidizing reaction. For example, methanol vapor and air are mixed, and hydrogen is generated by oxidizing this mixed gas under a catalyst. The heat generated in this oxidation process is used to promote the above-mentioned fuel reforming reaction. Accordingly, the heat absorbed by the endothermic reaction can be compensated by using this partial oxidizing reaction. It is not necessary to give heat from the outside, because a heating value and a heat absorbing value can be balanced. That is, it is only possible that the temperature of the fuel reforming apparatus can be maintained constant by balancing the heat values with the reforming and oxidizing reactions. It is, however, not possible that the temperature of the fuel reforming apparatus is set to a target temperature.

This means that it is necessary to heat from the outside to set the appropriate temperature of the reformer for the fuel reforming reaction or the activation of the catalyst. In order to achieve the above-mentioned object, the raw fuel mixed by methanol and water becomes the mixed vapor having a predetermined temperature by burning heat of a burning device, and the mixed vapor is supplied to the reformer.

If the above-mentioned fuel reforming apparatus is used as means for supplying fuel gas for a fuel cell, it is necessary to control the reaction in the fuel reforming apparatus on the basis of a fluctuation of a load of the fuel cell. That is, it is necessary to increase a quantity of the reformed raw fuel gas when the load of the fuel cell increases, or it is necessary to decrease a quantity of the reformed raw fuel gas when the load of the fuel cell decreases. In order to increase or decrease a quantity of the reformed raw fuel gas, it is necessary to increase or decrease a quantity of the raw fuel gas mixed by the methanol and water which is supplied to the reformer. Consequently, it is necessary to increase or decrease a heat value which is consumed in order to generate the mixed vapor of the methanol and the water having the predetermined temperature.

One example of control devices controlling such as the above-mentioned way is disclosed in Japanese Laid-Open Patent Application No. 7-296834. The control device is for a plant in which a fuel reforming apparatus is heated by a burner. By detecting an inlet and an outlet temperatures of the fuel reforming apparatus and an inlet and an outlet temperatures of a burner in the fuel reforming apparatus, a quantity of a fuel gas flow and an oxidizing agent is controlled on the basis of these temperatures. The stable burning of the burner in the fuel reforming apparatus is then maintained.

As proposed in the aforementioned Japanese Laid-Open Patent Application, if an inlet and an outlet temperatures of the fuel reforming apparatus and an inlet and an outlet temperatures of the burner in the fuel reforming apparatus is detected, not only a condition of a reforming reaction and a temperature of the reforming reaction can be known, but a stable condition of the burning can also be known in the case that unused raw fuel gas is burned by the burner. Accordingly, the stable burning of the burner can be maintained by controlling on the basis of the detected values. The control is, however, insufficient when the quantity of raw fuel supplied to the fuel reforming apparatus fluctuates.

These fuel reforming apparatuses are usually used as a fuel source for a fuel cell or etc., as written in the above-mentioned Patent Application, and a quantity of raw fuel supplied to the fuel reforming apparatus changes according to a required quantity of raw fuel. Since the raw fuel is supplied at the lower temperature than the activating temperature of a catalyst for a reforming reaction of the raw fuel, it is necessary to heat the raw fuel and make it vapor. That is, it is necessary to increase or decrease a quantity of fuel for burning on the basis of the fluctuation of the raw fuel. There are, however, several obstructing factors as mentioned below. One is a time delay from the indication time to change a quantity of raw fuel until the real time to supply the raw fuel to a vapor device in the fuel reforming apparatus. Another is a time delay from the indication time to change a quantity of fuel for burning until the real time to supply the fuel for burning to the burning device. Furthermore, the other is a time delay until attaining to the heat value corresponding to the quantity of the fuel for burning, and the other factor is a relative discrepancy between the real condition and surroundings according to the fluctuation of the quantity of raw fuel or fuel for burning. Therefore, when the heat of raw fuel is controlled on the basis of the fluctuation of temperatures caused by the fuel reforming reaction or the burning of the fuel, it is not possible to obtain the quantity of raw fuel having the target temperature, and it may occur that the burning device melts in some parts and suffers damage.

SUMMARY OF THE INVENTION

It is thus one object of the present invention to solve the aforementioned problems. Another object of the invention is to provide a control device for a fuel reforming apparatus improving transient responsibility of a control for heating raw fuel.

A fuel reforming apparatus comprises a heating device, and the heating device heats raw fuel to a predetermined target temperature. A control device for the fuel reforming apparatus comprises a raw fuel quantity determinator for determining a quantity of raw fuel supplied to the heating device and a target temperature setting means for setting the target temperature of the raw fuel on the basis of the quantity of raw fuel determined by the raw fuel quantity determinator.

If a quantity of raw fuel supplied to the heating device increases, the latent heat of the raw fuel increases when the raw fuel vapors. Since the target temperature of the raw fuel is set high, the temperature of the heated raw fuel is prevented from lowering even if a heat value taken as vaporizing latent heat increases. Accordingly, the target temperature of the raw fuel can be achieved.

The heating device comprises a burning device and a vaporizing device. The burning device oxidizes fuel for burning with air, and the vaporizing device vaporizes the raw fuel. The control device further comprises an air quantity controller for controlling a quantity of air supplied to the heating device based on the quantity of raw fuel determined by the raw fuel quantity determinator.

When a quantity of raw fuel is less, a quantity of air supplied to the heating device is less. On the contrary, when a quantity of raw fuel is more, a quantity of air is more. If a target temperature of raw fuel is set low because the quantity of raw fuel is less, then, a heat value for heating the air and increasing the temperature of the air or a heat value which the air takes out becomes less because the quantity of the air is less. On the contrary, if a target temperature of raw fuel is set high because the quantity of raw fuel is more, a heat value for heating the air and increasing the temperature of the air or a heat value which the air takes out becomes more because the quantity of raw fuel is more. Consequently, the raw fuel does not under-heat or over-heat.

It is also available that the control device further comprises a detector for detecting a physical value indicating the quantity of raw fuel heated by the heating device and a correcting means for correcting the target temperature on the basis of the physical value detected by the detector.

Since the control device has the above-mentioned detector and the correcting means, the quantity of air supplied to the heating device or the target temperature of raw fuel is corrected on the basis of the quantity of raw fuel flow or so. Accordingly, a deviation of heat value in the heating device, a deviation heat exchanging value, or a producing deviation of functional parts such as a valve included in the fuel reforming apparatus does not influence the temperature of the raw fuel.

If the control device further comprises a heat value correcting means for correcting a heat value of the heating device on the basis of the heat capacity of the heating device, the heat value of the heating device is controlled by considering the heat capacity of the heating device. Thus, the raw fuel is precisely heated and is not insufficiently heated or over heated.

BRIEF DESCRIPTION OF THE DRAWINGS

The above and other objects, features, advantages, and technical and industrial significance of this invention will be better understood by reading the following detailed description of a presently preferred embodiment of the invention, when considered in connection with the accompanying drawing, in which.

DETAILED DESCRIPTION OF PREFERRED EMBODIMENTS

Figure 7:
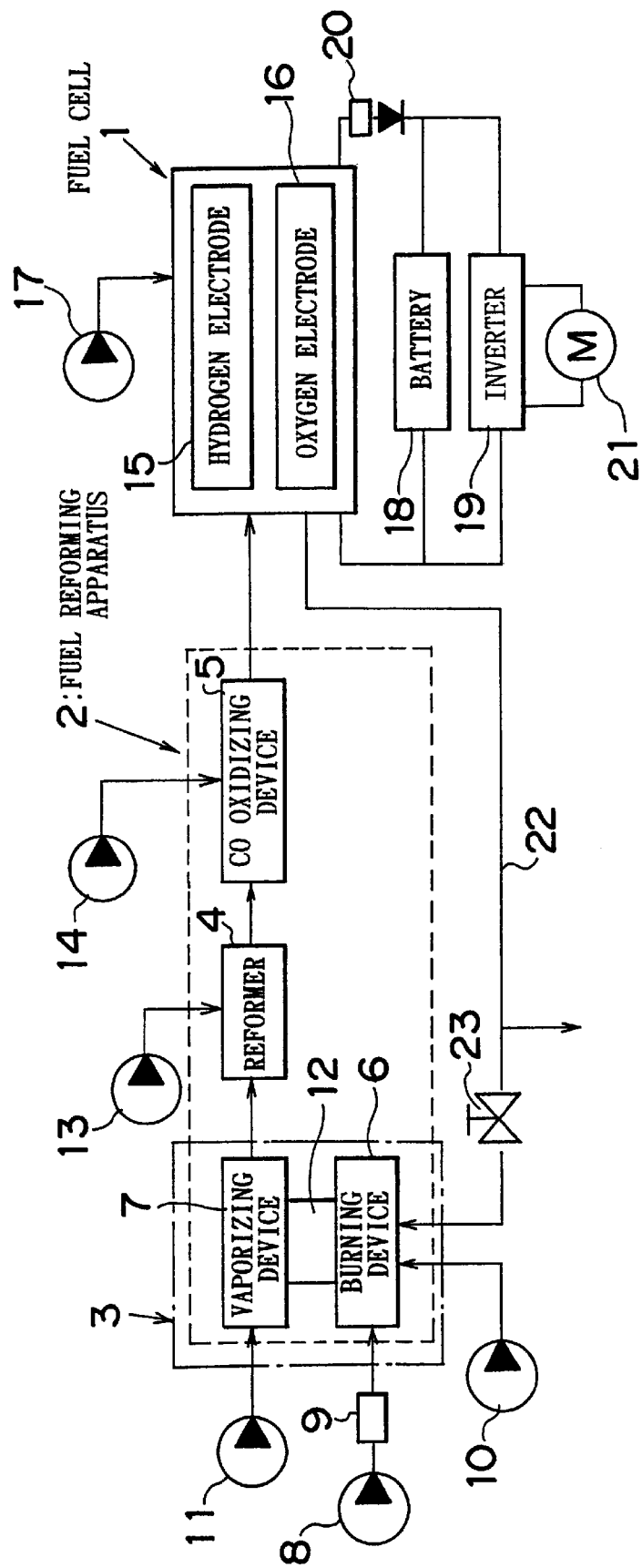
FIG. 7 is a schematic block diagram showing a system of the fuel reforming apparatus connected to a fuel cell.

In the following description and the accompanying drawings, the present invention will be described in more detail in terms of specific embodiments. First, a system, in which a fuel reforming apparatus uses raw fuel comprising methanol and water and a fuel cell is used as an energy transferring device transferring reformed raw fuel gas reformed by the fuel reforming apparatus to an energy in another form, is explained. FIG. 7 schematically shows one of these systems. A fuel reforming apparatus 2 is connected to a hydrogen electrode 15 in a fuel cell 1. The fuel reforming apparatus 2 reforms raw fuel which is a mixture of methanol and water to hydrogen and carbon dioxide, and it comprises a heating device 3 which heats the raw fuel, a reformer 4, and CO oxidizing device 5.

The heating device 3 generates mixed vapor of methanol and water by heating the raw fuel. In the heating device 3, a burning device 6 generates heat for heating the raw fuel, and a vaporizing device 7 vaporizes the raw fuel by the heat. As one example of the burning device 6, a structure of burning the raw fuel with a burner or a structure of oxidizing the raw fuel by a catalyst can be adopted. An injector 9 connects to a fuel pump 8 which supplies methanol, as one example of fuel for burning to the burning device 6. An air pump 10 supplies air, as one example of gas assisting for burning of the fuel for burning, to the burning device 6.

A raw fuel pump 11 supplies mixed liquid of methanol and water to the vaporizing device 7. A heat exchanger 12 connects the vaporizing device 7 to the burning device 6. The structure of the heating device 3 is described later in detail.

The above-mentioned reformer 4 generates hydrogen rich gas by a reforming reaction of methanol and water. To be concrete, reformed raw fuel gas mainly comprising hydrogen is generated by the reforming reaction using a copper-based catalyst having an activation temperature of approximately 280° C. as shown in the following chemical equation.

$$CH_3OH+H_2O \rightarrow CO_2+3H_2 \tag{1}$$

This reformer 4 generates hydrogen gas and heat by a partial oxidizing reaction of methanol, and air is supplied by an air pump 13 for this purpose. The reforming reaction as shown the above-mentioned equation (1) is a heat absorbing reaction, and the partial oxidizing reaction of methanol shown in the following equation (2) is a heat producing reaction. By balancing the heat generated by the exothermic reaction and the heat consumed by the endothermic reaction, the temperature of the reformer 4 is substantially maintained constant.

$$CH_3OH + \tfrac{1}{2}O_2 \rightarrow 2H_2 + CO_2 \qquad (2)$$

The above-mentioned reforming and partial oxidizing reactions shown (1) and (2) are executed in the ideal condition, and the carbon dioxide reversibly changes to a carbon monoxide. In an actual condition, the carbon monoxide inevitably gets mixed into the reformed fuel gas. Since this carbon monoxide damages a catalyst in the hydrogen electrode 15 in the fuel cell 1, the CO oxidizing device 5 is provided in order to get rid of the carbon monoxide. The CO oxidizing device 5 comprises a CO oxidizing catalyst (not shown in the figures) and an air pump 14. By passing of the reformed gas reformed by the reformer 4 through the CO oxidizing device 5, the carbon monoxide contained in the reformed raw fuel gas is oxidized by oxygen in air.

The fuel cell 1, for example, comprises an electrolyte membrane (not shown in the figures) such as a polymer membrane having proton permeability, the hydrogen (also called fuel) electrode 15, and an oxygen (also called air) electrode 16. The hydrogen electrode 15 and the oxygen electrode 16 sandwich the electrolyte membrane. The fuel cell 1 comprises a plurality of such unit cells arranged serially. The hydrogen or oxygen electrode 15, 16 comprises a catalyst layer and a gas diffusion layer, and the catalyst layer in the hydrogen electrode 15, for example, has a porous structure which is for example carbon pregnant with a catalyst such as platinum, an alloy of platinum, or ruthenium. The fuel reforming apparatus 2 is connected to the hydrogen electrode 15, and the reformed raw fuel gas mainly containing a hydrogen gas is supplied to the hydrogen electrode 15. An air supplier 17 such as an air pump is connected to the oxygen electrode 16, and oxygen is supplied for the reaction with the hydrogen in the reformed raw fuel gas.

Incidentally, a battery 18 or an inverter 19 is connected to the hydrogen and oxygen electrodes 15, 16 so that they constitutes a closed circuit. An electric current sensor 20 is provided in the closed circuit. Furthermore, an electric motor 21 is connected to the inverter 19. This motor 21 is a power source, for example, for driving a vehicle.

An ionization of the hydrogen generated in the hydrogen electrode 15 and an oxidizing reaction by way of the electrolyte membrane is not always executed for all hydrogen gas supplied to the fuel cell 1, and an efficiency of the reaction is several tens of a percentage. Consequently, an exhaust gas (hereinafter called an off-gas) generated from the hydrogen electrode 15 contains an unused burnable gas, that is a hydrogen gas. A return pipe 22 connects the fuel cell 1 to the burning device 6 so that it returns the off-gas from the hydrogen electrode 15 to the burning device 6 in order to reuse the unused gas effectively. In the middle of the return pipe 22, a flow control valve 23 controls a quantity of gas flow in the return pipe 22. Incidentally, the aforementioned quantity of flow, here, means a quantity of flow per unit time, and hereinafter it means the same. Opening degrees of the flow control valve 23 is electronically controlled. Moreover, some of the flowing gas in the return pipe 22 can be exhausted appropriately without being supplied to the burning device 6.

Figure 8:
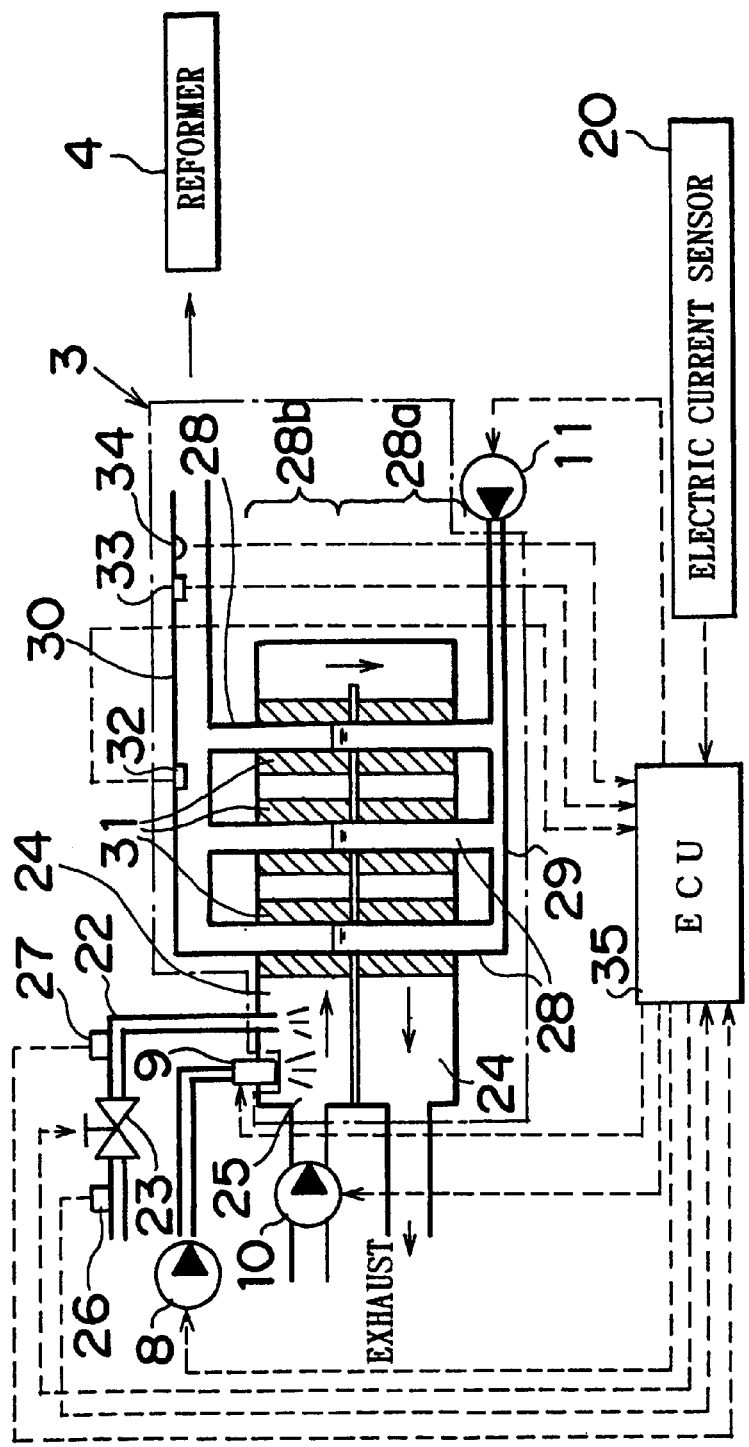
FIG. 8 is a schematic block diagram including an illustration of a heating device showing a control system of the control device for the fuel reforming apparatus.

In FIG. 8, the heating device 3 is shown with a control system. The burning device 6 has a burning chamber 24 in which the raw fuel is oxidized, and the raw fuel is heated by burning the fuel for burning (hereinafter called methanol for burning) and/or the unused burnable gas with the air in the burning chamber 24. The burning chamber 24 is divided into upper and lower chambers. The injector 9 is deposited at the inlet of the upper chamber of the burning chamber 24, and the methanol for burning is sprayed to the upper chamber of the burning chamber 24 from the injector 9. An air supplying port 25 is deposited near the sprayed spot of the methanol for burning in the upper chamber of the burning chamber 24, and the air pump 10 is connected to the air supplying port 25.

Furthermore, a return pipe 22 is connected to the upper chamber of the burning chamber 24 near the injector 9. Pressure sensors 26, 27 are arranged on both sides of the flow control valve 23, and the pressures of the upper and lower streams are detected by these pressure sensors 26, 27. The upper and lower chambers dividing in the burning chamber 24 are connected together on the opposite side of the injector 9 in the burning chamber 24, and the left side of the lower chamber is open to the outside for exhaust as shown in FIG. 8.

The heat exchanger 12 is provided in the burning chamber 24. The heat exchanger 12 has a plurality of vaporizing pipes 28 so that they vertically pass through the burning chamber 24 in the airtight condition. One end of each vaporizing pipe 28 is connected to a supplying pipe 29 and the opposite end of each vaporizing pipe 28 is connected to a vapor pipe 30. Furthermore, each oxidizing catalyst is deposited on the outer surface of each vaporizing pipe 28 in the burning chamber 24. The methanol for burning or the unused hydrogen gas in the off-gas supplied to the burning chamber 24 is, then, oxidized by the oxygen in the air in the burning chamber 24 and generates heat. There is the raw fuel having a predetermined height in each vaporizing pipe 28. The vaporizing pipe 28 is divided into a lower boiling part 28a and an upper vapor heating part 28b. The raw fuel vapor is generated from the raw fuel liquid in the boiling part 28a, and the raw fuel vapor is heated in the vapor heating part 28b.

Pressure sensors 32, 33 are arranged at the upper and lower streams of the vapor pipe 30, and they detect pressures of the raw fuel vapor at each spot. Furthermore, a flow meter 34 is provided for detecting a quantity of raw fuel vapor flow on the further lower place of the vapor pipe 30 from the pressure sensor 33, and the raw fuel flow is supplied to the reformer 4 by way of the vapor pipe 30.

The above-mentioned pumps 8, 10, 11 are electronically controlled, and the outlet quantity of the pumps are appropriately controlled. An electrical control unit (ECU) 35 is provided for these controls. The ECU 35 comprises a micro-computer, having such as a center processing unit (CPU), memory units (RAM, ROM), input and output interfaces, and etc. The detected data of each above-mentioned sensor 26, 27, 32, 33, or the flow meter 34 is inputted to the ECU 35, as control data. Moreover, the detected signal of the electric current sensor 20 for detecting the load of the fuel cell 1 is inputted to the ECU 35. The opening degrees of the flow control valve 23 is also controlled by the ECU 35.

Next, the basic action of the above-mentioned fuel reforming apparatus 2 is explained. Raw fuel, that is mixed liquid of methanol and water, is supplied to the vaporizing pipes 28 by way of the supplying pipe 29 and the raw fuel pump 11. On the other hand, methanol for burning is sprayed to the burning chamber 24 by the injector 9, and/or the off-gas containing the unused hydrogen gas is supplied to the burning chamber 24 by way of the return pipe 22. Air as burning assisting gas is supplied to the burning chamber 24 by the air pump 10. The methanol for burning and/or the unused hydrogen gas are oxidized with air by catalysis of an oxidizing catalyst 31, that is they are burnt, and heat is generated. Since the vaporizing pipe 28 is heated by this heat, the mixed liquid inside of the vaporizing pipe 28 vaporizes and the mixed vapor of methanol and water is generated. An exhaust gas generated by the burning goes out by way of an exhaust pipe 36.

The mixed gas generated in the vaporizing pipe 28 is sent to the reformer 4 by way of the vapor pipe 30. The reforming reaction of methanol and water occurs with copper-based catalyst provided in the reformer 4, and the reformed fuel gas mainly containing hydrogen gas and carbon dioxide gas is generated. Concurrently, the partial oxidizing reaction of methanol and air supplied into the reformer 4 by the air pump 13 occurs. This partial oxidizing reaction is expressed in the equation (2), and it results in generating hydrogen gas and carbon dioxide gas. The reforming reaction of methanol is an endothermic reaction, and on the other hand the partial oxidizing reaction of methanol is an exothermic reaction. Consequently, if each reaction is controlled so that heat values of the endothermic and exothermic reactions are equal, the input and output heats can be balanced. The temperature of the reformer 4 can then be maintained. Since there is no input or output heat in the reformer 4, the heat generated in the burning device 6 is exclusively used for heating the raw fuel and vaporizing it.

The gas generated by the reformer 4 is principally a mixture gas of hydrogen gas and carbon dioxide gas. Actually, only a small percentage of carbon monoxide gas is present (approximately 1%). Most of the carbon monoxide gas becomes carbon dioxide gas by the reaction with the oxygen in the air supplied from the air pump 14 when the reformed fuel gas passes through the CO oxidizing device 5. The reformed raw fuel gas having rich hydrogen is sent to the hydrogen electrode 15 in the fuel cell 1, and a hydrogen ion and an electron is generated at the reaction catalyst layer in the hydrogen electrode 15. The hydrogen ion permeates and passes through the electrolyte membrane, and water is generated by the reaction with oxygen in the oxygen electrode 16. The electron generates electric power by passing an outer load.

In this way a quantity of reformed raw fuel gas generated by the fuel reforming apparatus 2 is controlled according to a load applied to the fuel cell 1. Accordingly, a quantity of mixed gas of methanol and water generated in the heating device 3 is controlled on the basis of a load applied to the fuel cell 1. In a control device of the present invention the heating of the raw fuel is controlled as follows in order to heat a quantity of raw fuel on the basis of a load applied to the fuel cell 1.

Figure 1:
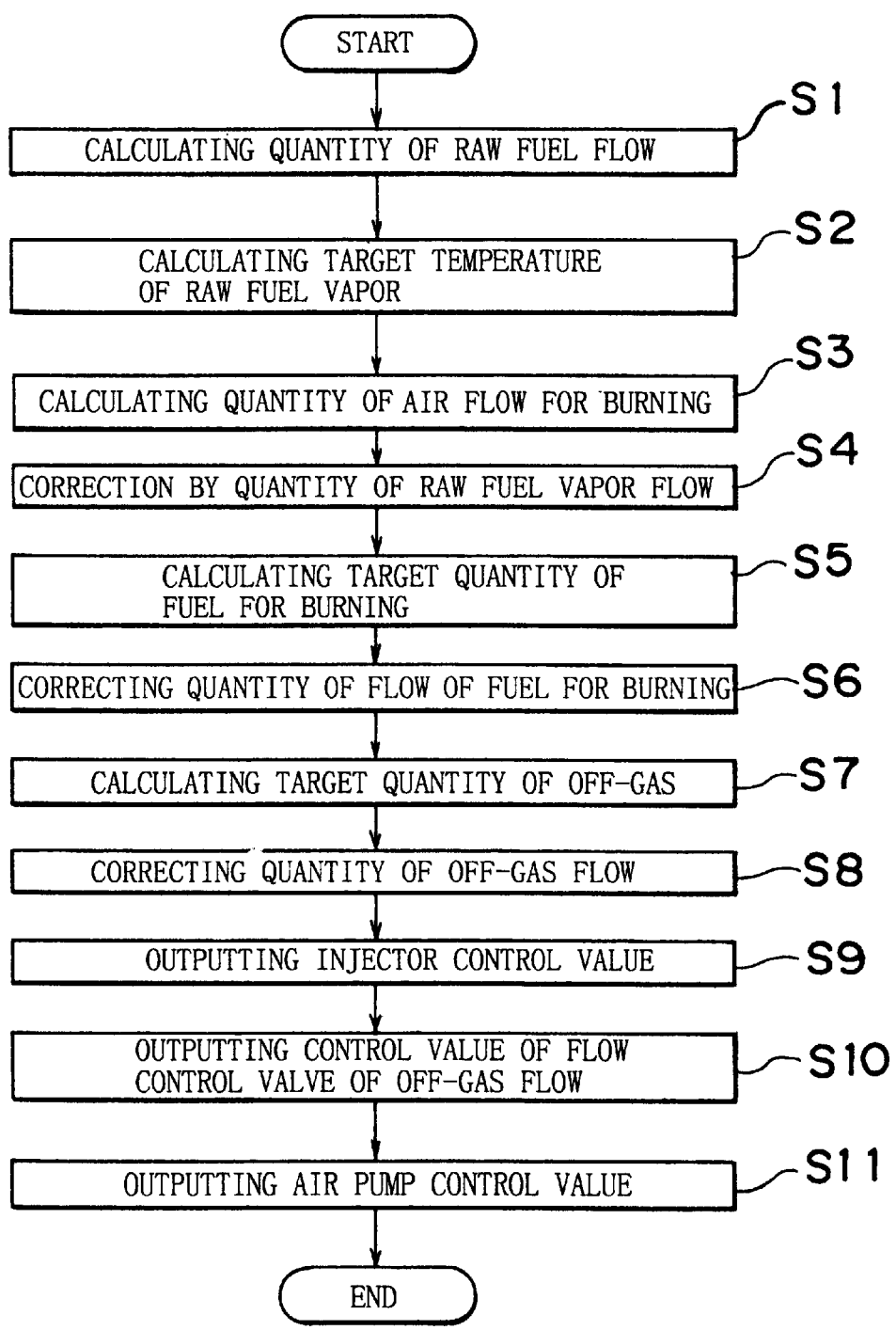
FIG. 1 is a flowchart explaining one example of controls of a control device for a fuel reforming apparatus of the present invention.

FIG. 1 is a flowchart explaining one example of the control. First, a calculation of a quantity of raw fuel (mixed liquid of methanol and water) flow is executed in S1 (S1 means Step 1, hereinafter expressed in same way.) Incidentally, a quantity of raw fuel means a quantity of raw fuel flow per unit time. Since the hydrogen gas which is used in the fuel cell 1 is generated in the reforming reactions shown by the equations (1) and (2), the quantity of raw fuel flow can be calculated on the basis of a load (ampere value) applied to the fuel cell 1, an efficiency of the reforming, a usage rate of the hydrogen gas in the fuel cell 1, and a Faraday constant, etc.

Next, a target temperature of the raw fuel vapor is calculated in S2. In the heating device 3 shown in FIG. 8, the mixed liquid of methanol and water is in the boiling part 28a, and the raw fuel vapor is generated from the mixed liquid in the vapor heating part 28b. The raw fuel gas is generated by supplying the mixed liquid to the vaporizing pipe 28 and by heating the mixed liquid by burning the methanol for burning and/or the unused hydrogen gas. In this case if the height of the mixed liquid is constant in the vaporizing pipe 28, a quantity of raw fuel flow Fel is equal to a quantity of raw fuel vapor flow Feg. That is, $$Fel=Feg \tag{3}$$

In this condition of the vaporizing device 7 there is not a delay of transient response, and this condition is the purpose of the control of the fuel reforming apparatus.

Comparing a latent heat of vaporizing the mixed raw fuel liquid with a specific heat of the raw fuel vapor, the latent heat of vaporizing the raw fuel is sufficiently greater than the specific heat of the raw fuel vapor. If fuel for burning is supplied so that the height of the liquid in the vaporizing pipe 28 remains constant, the following inequality is introduced.

$$\text{A vapor temperature in the case of less supplied quantity} < \text{A vapor temperature in the case of more supplied quantity} \tag{4}$$

That is, the gas having less specific heat (that is, the raw fuel vapor) has a tendency to be easily warmer, when a heat value of the raw fuel is increased in order to have more qualities of the raw fuel vapor, because thermal transferring areas to the liquid part and to the vapor part are constant though the quantity of raw fuel flow Fel changes.

Figure 2:
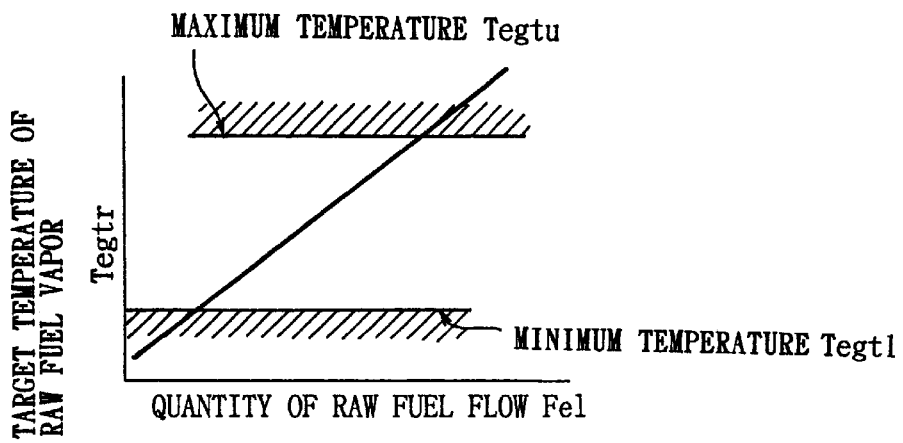
FIG. 2 is one example of graphs showing a relation between a quantity of raw fuel and a target temperature of the raw fuel vapor.

Although the relation between the quantity of raw fuel liquid and the degree of the increasing temperature is basically explained as the aforementioned inequality (4), actually it is affected by the structure of the heating device 3. Accordingly, the relationship between a quantity of raw fuel flow Fel and a target temperature of a raw fuel vapor Tegtr are prepared by an experiment or a calculation on the basis of specifics of the fuel reforming apparatus. One example is shown in FIG. 2. The calculation in S2 is in concrete executed by gaining the target temperature of the raw fuel vapor Tegtr according to the graph shown in FIG. 2.

Next, a quantity of air flow for burning is calculated (S3). Here, as mentioned above the quantity of air flow also means a quantity of air flow per unit time. This is for the purpose to prevent the raw fuel vapor from over-heating or the raw fuel vapor from being at an insufficient temperature by controlling the heating value which is consumed or carried out by the air flow supplied to the burning device 6 for assisting the burning of the fuel. The target temperature of a raw fuel vapor Tegtr is set in the control in S2. Since the activating temperature of the reforming catalyst is constant as mentioned above, the target temperature of the raw fuel vapor calculated in S2 may happen to be by a great value less, or on the contrary greater than the activating temperature. If this case happens, the activation of the reformer 4 deteriorates or a reforming efficiency reduces by promotion of the deterioration of the catalyst and methanol remains as the reformed raw fuel. Furthermore, the quality of the reformed raw fuel deteriorates, for example more quantity of carbon monoxide is contained, and an electric current value versus electric pressure (IV characteristic) deteriorates. It is then difficult to generate sufficient electric power.

The maximum temperature Tegtu and the minimum temperature Tegtl of the target temperature of the raw fuel vapor Tegtr is determined by this condition, and the quantity of air for burning is calculated so that the target temperature of the raw fuel vapor Tegtr is between the maximum temperature Tegtu and the minimum temperature Tegtl. This is the control of adjusting the heat value consumed by the air supplied to the burning device 6 and the heat value taken out by the air, by controlling the supplied quantity of the air. That is, if the quantity of the air is low, the heat value consumed by the air and the heat value taken out by the air is low in the side of the vapor heating part 28b. Consequently, the temperature of the raw fuel vapor is then high, and this control is executed when the quantity of raw fuel Fel is low, that is the target temperature of the raw fuel vapor Fegtr is low, as shown in FIG. 2. That is, when the quantity of raw fuel flow Fel is low, the A/F in the burning device 6 is controlled to be low and the temperature of the raw fuel vapor is controlled to be equal to or more than the minimum temperature Tegt1.

On the contrary, if the quantity of supplied air is controlled to be large, the heat value consumed by the air and the heat value taken out by the air is large in the vapor heating part 28b. Accordingly, the temperature of the raw fuel vapor is low, and this control is executed when the quantity of raw fuel flow Fel is large, that is the target temperature of the raw fuel vapor Tegtr is high, in the calculation based on FIG. 2. That is, when the quantity of raw fuel flow Fel is large, the A/F in the burning device 6 is controlled to be large and the over-heating of the raw fuel vapor is avoided.

Figure 3:
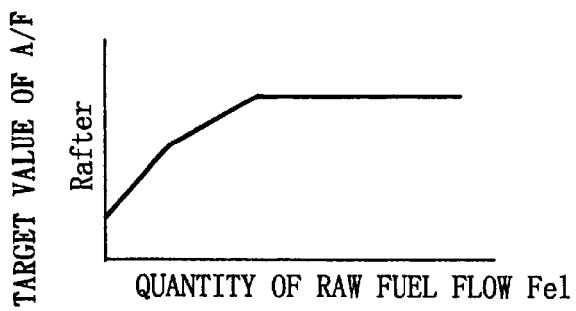
FIG. 3 is an example of graphs showing a relation between a quantity of raw fuel and a target value of air-fuel ratio (A/F)
Figure 4:
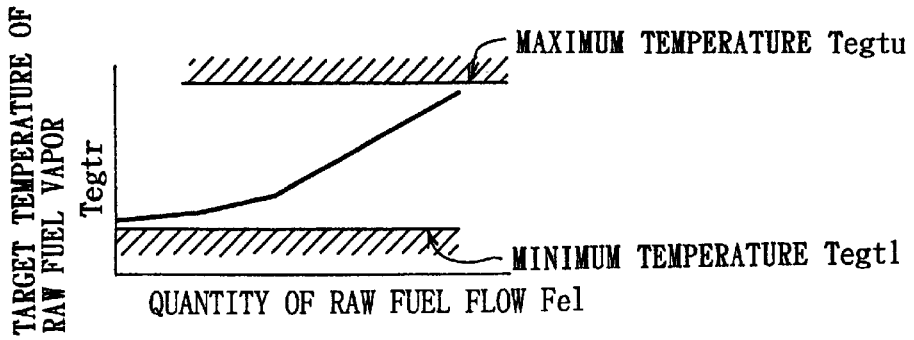
FIG. 4 is an example of graphs showing a relation between a target temperature of raw fuel vapor corrected on the basis of a quantity of supplied air and a target A/F.

A target value of A/F Raftr which is set by considering the above-mentioned insufficient-heating and over-heating of the raw fuel vapor can be calculated by an experiment or a calculation as shown in FIG. 3. In S3, the quantity of the air is calculated on the basis of the graph shown in FIG. 3. The relationship between the quantity of raw fuel flow Fel and the target temperature of raw fuel vapor Tegtr which is corrected on the basis of FIG. 3 is shown by the graph in FIG. 4.

Figure 5:
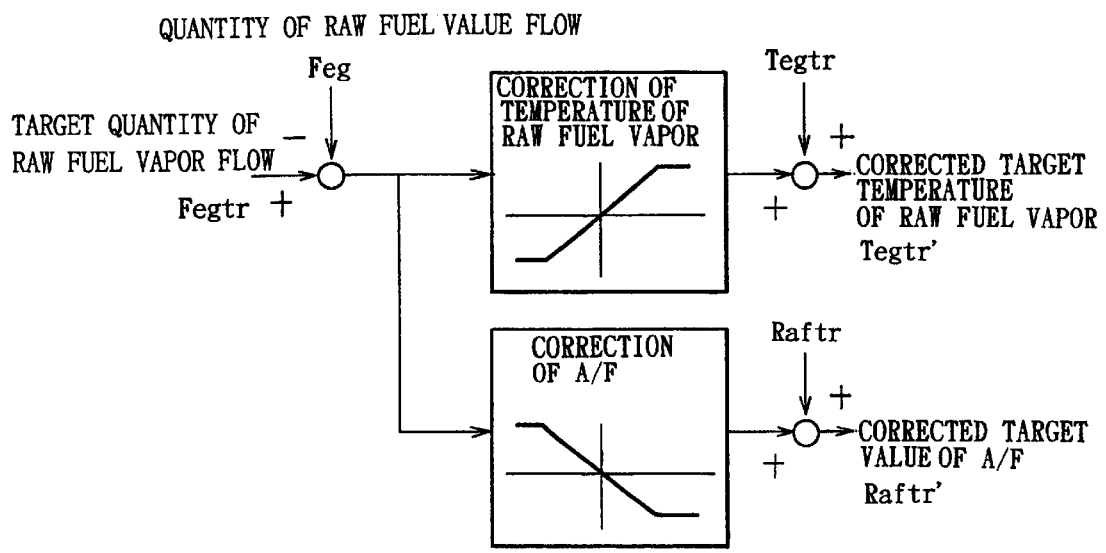
FIG. 5 is a schematic diagram illustrating a correction between a target temperature of raw fuel vapor corrected on the basis of a detected quantity of raw fuel vapor and a target A/F.

The burning device 6 is controlled so that the temperature of raw fuel vapor Teg is equal to or more than the target temperature Tegtr which is introduced as mentioned above. In this case, the quantity of supplied raw fuel flow Fel may happen not to be the quantity of raw fuel vapor flow Feg, because of quality deviation of the oxidizing catalyst 31, a supplying device of the methanol or the unused hydrogen gas, or etc. In order to correct this discrepancy, the target temperature of raw fuel vapor Tegtr and the target value of A/F Raftr is corrected. FIG. 5 schematically shows such a correction.

This correction is executed on the basis of a physical value indicating a quantity of raw fuel vapor flow in the vaporizing pipe 28 (S4). In concrete the correction value of the target temperature of raw fuel vapor Tegtrfb is calculated by multiplying (Fegtr minus Feg) by a correction gain K1. Here, Fegtr is the target quantity of raw fuel vapor flow which is the same quantity of the quantity of raw fuel flow Fel, and Feg is the actual quantity of raw fuel flow Fel which is detected by the flow meter 34. In the same way, the correction value of the target A/F Raftrfb is calculated by multiplying (Fegtr minus Feg) by a correction gain K2.

$$\text{Tegtrfb} = K1(\text{Fegtr} - \text{Feg}) \tag{5}$$

$$\text{Raftrfb} = K2(\text{Fegtr} - \text{Feg}) \tag{6}$$

Incidentally, the correction value of the target temperature of raw fuel vapor Tegtrfb is between the maximum value Tegtrfbmax and the minimum value Tegtrfbmin, and the correction value of the target A/F Raftrfb is between the maximum value Raftrfbmax and the minimum value Raftrfbmin, as follows.

$$\text{Tegtrfbmin} \leq \text{Tegtrfb} \leq \text{Tegtrfbmax} \tag{7}$$

$$\text{Raftrfbmin} \leq \text{Raftrfb} \leq \text{Raftrfbmax} \tag{8}$$

As shown the inequalities (7), (8), these correction values are set.

A renewed target values Tegtr' and Raftr' are introduced by adding the target temperature of raw fuel vapor flow Tegtr and the target value of A/F Raftr by the above-mentioned correction values Tegtrfb and Raftrfb as follows.

$$\text{Tegtr}' = \text{Tegtr} + \text{Tegtrfb} \tag{9}$$

$$\text{Raftr}' = \text{Raftr} + \text{Raftrfb} \tag{10}$$

In the aforementioned examples the corrections are executed based on the detected data which are acquired by directly detecting raw fuel vapor flow. However, it is also available that the correction is executed on the basis of a quantity of raw fuel vapor flow estimated by a pressure in the vapor pipe 30. The quantity of raw fuel vapor flow Feg is calculated on the basis of an input pressure Pr and an output pressure Peg as shown in the following equation (11).

$$\text{Feg} = C \times (\text{Peg} - Pr)^{1/2} \tag{11}$$

Here, the input pressure Pr is an input pressure of the reformer 4 and is detected by the pressure sensor 33 in the downstream in the vapor pipe 30. The output pressure Peg is an output pressure of the vaporizing device 7 and is detected by the pressure sensor 32 in the upstream in the vapor pipe 30. C is a predetermined coefficient.

A target quantity of flow of fuel (that is methanol) for burning Fbm in the burning device 6 is calculated (S5) so that the temperature of the raw fuel vapor is the target temperature Tegtr' calculated in the equation (9). That is, the target quantity of flow of methanol for burning Fbm can be calculated by dividing a necessary heat value by a heat value per unit quantity of methanol, because the heat value per unit quantity is known. The above-mentioned necessary heat value is calculated on the basis of the target quantity of raw fuel vapor flow, the temperature before the heating, specific heat of the raw fuel, a latent heat of vaporizing, a heat exchange efficiency, and etc.

Figure 6:
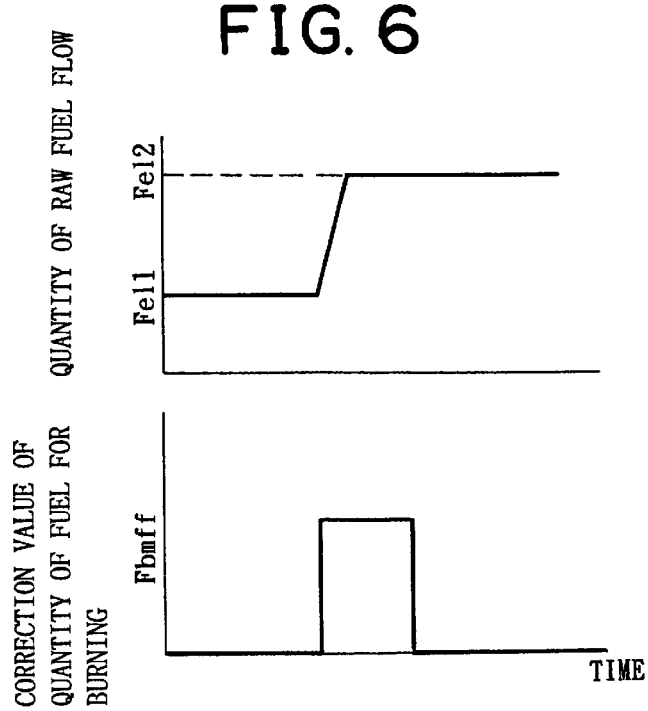
FIG. 6 is a graph showing a correction value of a quantity of fuel for burning at a transient time when a quantity of raw fuel changes as a step function.

When the heat value is changed by the fluctuation of required quantity of raw fuel vapor flow, the quantity of flow of methanol for burning is corrected on the basis of the heat capacity of the heating device 3 (S6). Since the change of the quantity of raw fuel vapor flow entails the increase or decrease of the target temperature of raw fuel vapor, the temperature of the heating device 3 changes and endothermic or exothermic phenomenon occurs by the change of the heating device 3. The target quantity of flow of methanol for burning Fbm is then corrected considering the above-mentioned condition. In concrete, when a quantity of raw fuel is increased from Fel1 to Fel2 per unit time as shown in FIG. 6, a correction value of quantity of methanol for burning Fbmff is calculated as shown in the following equation (12) on the basis of a difference between the target temperatures of raw fuel vapor Tegtr1 and Tegtr2 corresponding to Fel1 and Fel2.

$$\text{Fbmff} = (\text{Tegtr2} - \text{Tegtr1}) \times Ce / Hbm \tag{12}$$

Here, Ce is a heat capacity of the heating device 3, and Hbm is a reaction heat value per mole of the methanol for burning. Consequently, the correction value of methanol for burning Fbmff transiently increases as a step function, and the quantity of the methanol for burning is increased according to this correction value Fbmff. The increased quantity corresponds the heat capacity of the heating device 3.

As mentioned above, since the usage efficiency of reformed raw fuel gas in the fuel cell 1 does not reach 100%, and the off-gas from the fuel cell 1 contains unused hydrogen gas, the off-gas can be burnt for heating the raw fuel. Accordingly, in step S7 and S8, a quantity of off-gas supplied to the burning device 6 is calculated and the quantity of off-gas is corrected. In concrete, since an usage efficiency of hydrogen gas in the fuel cell 1 is known, a hydrogen density of the off-gas is known. Since a heat value is known in the case where the hydrogen is burnt, a required quantity of off-gas flow can be calculated by the heat value desired in the heating device 6. Furthermore, since a time delay from supply of the off-gas to heating of the raw fuel vapor is inevitable, a correction is executed according to the time delay.

Since the quantities of methanol for burning, off-gas, and air are calculated in such a way, these values are controlled to supply to the burning device 6. That is, a direct signal (that is, injector control value) is outputted so that the above-mentioned required quantity of methanol for burning is injected to the injector 9 (S9). An opening signal (that is, a control value of flow control valve of off-gas flow) is outputted to the flow control valve 23 so that the above-mentioned required quantity of the off-gas flows (S10). Furthermore, a direct signal is outputted to the air pump so that a reqired quantity of air flows (S11).

By executing the aforementioned control, the heating of raw fuel and the quantity of raw fuel vapor flow can be appropriately controlled at the transient when the quantity of raw fuel is changed. The quality and quantity of reformed raw fuel respond to the required output electric power of the fuel cell 1, and the usage efficiency of the reformed raw fuel in the fuel cell 1 is improved. Consequently, when the fuel cell with such a fuel reforming apparatus is constituted as a power source of an electric vehicle or a hybrid vehicle, a fuel consumption of the vehicle improves. In this case since a secondary battery used supplementarily shares a lower electric power, a volume of the secondary battery can be smaller, a weight of the vehicle can be reduced. Accordingly, a fuel consumption can be improved.

Since the target temperature of raw fuel is controlled between the predetermined maximum and minimum temperatures by controlling the quantity of sir flow, damage to the heating device caused by melting or so is prevented beforehand, and at the same time a high quality of raw fuel is produced by maintaining an activating ability of the reforming catalyst. Furthermore, since the reforming efficiency improves and an electric pressure of the fuel cell 1 is restrained, it is not necessary to restrain driving power of the vehicle, driving performance improves, and the secondary battery installed supplementarily shares lower. The fuel consumption of the vehicle improves.

Incidentally, a calculation or a treatment of data based on each detected data or each above-mentioned graph is executed in the ECU 35 shown in FIG. 8. In the functions, the raw fuel quantity determinator mentioned in claim 1 corresponds to the function in S1. The target temperature setting means in claim 1 corresponds to the function in S2. The air quantity controller in claim 4 corresponds to the function in S3. The detector for detecting a physical value in claim 6 corresponds to the pressure sensor 32, 33 or the flow meter 34, and the correcting means corresponds to the function of S4 shown in FIG. 1. Moreover, the heat value correcting means in claims 11 through 20 correspond to the function of S6 shown in FIG. 1.

This invention is not limited to the above-mentioned examples. For example, a control device for a fuel reforming apparatus which is not used for a vehicle is also available. Furthermore, a control device for a fuel reforming apparatus except one which supplies reformed raw fuel gas can also be adopted. The structure of the heating device is not limited to the above-mentioned one, and a burner which directly burns the raw fuel without using the oxidizing catalyst is also available.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A control device for a fuel reforming apparatus, said fuel reforming apparatus comprising a heating device, said heating device heating raw fuel to a target temperature determined for the fuel reforming apparatus, said control device comprising:

a raw fuel quantity determinator for determining a quantity of raw fuel supplied to said heating device;

a target temperature setting means for setting the target temperature of the raw fuel supplied to said heating device on the basis of the quantity of raw fuel determined by said raw fuel quantity determinator, a detector for detecting a value indicating the quantity of raw fuel heated by said heating device; and a correcting means for correcting said target temperature on the basis of the value detected by said detector.

2. The control device for a fuel reforming apparatus according to claim 1, wherein said heating device comprises a burning device, said burning device oxidizing fuel for burning with air.

3. The control device for a fuel reforming apparatus according to claim 1, wherein said heating device comprises a burning device and a vaporizing device, said burning device oxidizing fuel for burning with air, and said vaporizing device vaporizing the raw fuel.

4. The control device for a fuel reforming apparatus according to claim 2, further comprising an air quantity controller for controlling a quantity of air supplied to said heating device on the bases of the quantity of raw fuel determined by said raw fuel quantity determinator.

5. The control device for a fuel reforming apparatus according to claim 3, further comprising an air quantity controller for controlling a quantity of air supplied to said heating device on the bases of the quantity of raw fuel determined by said raw fuel quantity determinator.

6. The control device for a fuel reforming apparatus according to claim 1, further comprising a value correcting means for correcting a value of said heating device on the basis of the heat capacity of said heating device.

7. The control device for a fuel reforming apparatus according to claim 2, further comprising a value correcting means for correcting a value of said heating device on the basis of the heat capacity of said heating device.

8. The control device for a fuel reforming apparatus according to claim 3, further comprising a value correcting means for correcting a value of said heating device on the basis of the heat capacity of said heating device.

9. The control device for a fuel reforming apparatus according to claim 4, further comprising a value correcting means for correcting a value of said heating device on the basis of the heat capacity of said heating device.

10. The control device for a fuel reforming apparatus according to claim 5, further comprising a value correcting means for correcting a value of said heating device on the basis of the heat capacity of said heating device.

11. A fuel cell with a fuel reforming apparatus controlled by the control device according to claim 1, said fuel reforming apparatus supplying reformed fuel to said fuel cell.

12. A fuel reforming apparatus, comprising:
- a heating device that heats a first fuel to a temperature within a temperature range by burning a second fuel; and
- a control device for controlling the heating device, the control device comprising:
  - a measuring device for determining a quantity of the first fuel supplied to the heating device; and
  - a temperature range determining device for determining the temperature range within which the quantity of the first fuel should be heated based upon the quantity of the first fuel supplied to the heating device.

* * * * *